US011217785B2

(12) United States Patent
Ito et al.

(10) Patent No.: US 11,217,785 B2
(45) Date of Patent: Jan. 4, 2022

(54) COMPOSITE CATHODE ACTIVE MATERIAL AND SECONDARY BATTERY INCLUDING THE SAME

(71) Applicant: Samsung Electronics Co., Ltd., Suwon-si (KR)

(72) Inventors: Seitaro Ito, Yokohama (JP); Tomoyuki Shiratsuchi, Yokohama (JP); Yuichi Aihara, Yokohama (JP); Tomoyuki Tsujimura, Yokohama (JP)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 538 days.

(21) Appl. No.: 15/871,245

(22) Filed: Jan. 15, 2018

(65) Prior Publication Data
US 2018/0212233 A1 Jul. 26, 2018

(30) Foreign Application Priority Data

Jan. 24, 2017 (JP) .............................. JP2017-010297
Aug. 14, 2017 (KR) ......................... 10-2017-0103204

(51) Int. Cl.
*H01M 4/36* (2006.01)
*H01M 10/0525* (2010.01)
(Continued)

(52) U.S. Cl.
CPC .......... *H01M 4/366* (2013.01); *H01M 4/131* (2013.01); *H01M 4/362* (2013.01); *H01M 4/505* (2013.01);
(Continued)

(58) Field of Classification Search
CPC ...... H01M 4/366; H01M 4/131; H01M 4/525; H01M 4/505; H01M 10/0525;
(Continued)

(56) References Cited

U.S. PATENT DOCUMENTS

2009/0081554 A1  3/2009  Takada et al.
2010/0216030 A1  8/2010  Maeda
(Continued)

FOREIGN PATENT DOCUMENTS

CN  104009111  *  8/2014
CN  105428631  *  3/2016
(Continued)

OTHER PUBLICATIONS

Ito et al., "A rocking chair type all-solid-state lithium ion battery adopting Li2O—ZrO2 coated LiNi0.8Co0.15Al0.05O2 and a sulfide based electrolyte", Journal of Power Sources, 248, 2014, pp. 943-950.

*Primary Examiner* — Laura Weiner
(74) *Attorney, Agent, or Firm* — Cantor Colburn LLP

(57) ABSTRACT

A composite cathode active material including: a core particle; a first coating layer; and a second coating layer; wherein the core particle includes a cathode active material, the first and second coating layers cover a surface of the core particle, the first coating layer includes a first lithium-containing compound, wherein the first lithium-containing compound includes zirconium, niobium, titanium, aluminum, or a combination thereof, the second coating layer includes a second lithium-containing compound, wherein the second lithium-containing compound includes germanium, niobium, gallium, or a combination thereof, and the first lithium-containing compound is different from the second lithium-containing compound.

14 Claims, 2 Drawing Sheets

(51) Int. Cl.
*H01M 10/0562* (2010.01)
*H01M 4/131* (2010.01)
*H01M 4/525* (2010.01)
*H01M 4/505* (2010.01)
*H01M 4/02* (2006.01)

(52) U.S. Cl.
CPC ....... *H01M 4/525* (2013.01); *H01M 10/0525* (2013.01); *H01M 10/0562* (2013.01); *H01M 2004/028* (2013.01); *H01M 2300/0068* (2013.01)

(58) Field of Classification Search
CPC ....... H01M 10/0562; H01M 2004/028; H01M 2300/0068
See application file for complete search history.

(56) References Cited

U.S. PATENT DOCUMENTS

| | | | |
|---|---|---|---|
| 2011/0086274 | A1 | 4/2011 | Chang et al. |
| 2012/0094185 | A1 | 4/2012 | Tsuchida et al. |
| 2013/0040193 | A1 | 2/2013 | Tsuchida et al. |
| 2013/0309580 | A1 | 11/2013 | Tomura |
| 2014/0087270 | A1 | 3/2014 | Yoshida |
| 2014/0093786 | A1 | 4/2014 | Ito et al. |
| 2014/0227578 | A1 | 8/2014 | Yoshida |
| 2014/0227606 | A1 | 8/2014 | Suzuki et al. |
| 2014/0287324 | A1 | 9/2014 | Tsuchida et al. |
| 2014/0302229 | A1 | 10/2014 | Miki |
| 2015/0118574 | A1 | 4/2015 | Visbal et al. |
| 2015/0287985 | A1 | 10/2015 | Miki |
| 2016/0020487 | A1 | 1/2016 | Yamada et al. |
| 2016/0049646 | A1 | 2/2016 | Fujiki et al. |
| 2016/0079597 | A1 | 3/2016 | Fujiki et al. |
| 2016/0156021 | A1 | 6/2016 | Aihara et al. |
| 2017/0207456 | A1* | 7/2017 | Liu ............... H01M 4/366 |
| 2018/0212233 | A1 | 7/2018 | Ito et al. |

FOREIGN PATENT DOCUMENTS

| | | | |
|---|---|---|---|
| JP | 2010282948 A | 12/2010 | |
| JP | 201289406 A | 5/2012 | |
| JP | 2012514834 A | 6/2012 | |
| JP | 201337950 A | 2/2013 | |
| JP | 201389321 A | 5/2013 | |
| JP | 2013134825 A | 7/2013 | |
| JP | 5455766 B2 | 1/2014 | |
| JP | 2014022204 A | 2/2014 | |
| JP | 5551880 B2 | 5/2014 | |
| JP | 2014116129 A | 6/2014 | |
| JP | 2014116149 A | 6/2014 | |
| JP | 5578280 B2 | 7/2014 | |
| JP | 2014241208 A | 12/2014 | |
| JP | 201572818 A | 4/2015 | |
| JP | 2015072818 A | 4/2015 | |
| JP | 5737415 B2 | 5/2015 | |
| JP | 201588383 A | 5/2015 | |
| JP | 2015201252 A | 11/2015 | |
| JP | 2015201372 A | 11/2015 | |
| JP | 201624907 A | 2/2016 | |
| JP | 201642417 A | 3/2016 | |
| JP | 201662683 A | 4/2016 | |
| JP | 201681822 A | 5/2016 | |
| JP | 2016081822 A | 5/2016 | |
| JP | 2016103411 A | 6/2016 | |
| JP | 2018120705 A | 8/2018 | |
| WO | 2007004590 A1 | 1/2007 | |
| WO | 2012105048 A1 | 8/2012 | |
| WO | 2012157119 A1 | 11/2012 | |
| WO | 2013073038 A1 | 5/2013 | |
| WO | 2014013837 A1 | 1/2014 | |
| WO | WO 2009/084626 | * 7/2019 | |

* cited by examiner

COMPOSITE CATHODE ACTIVE MATERIAL AND SECONDARY BATTERY INCLUDING THE SAME

CROSS-REFERENCE TO RELATED APPLICATIONS

This application claims priority to and the benefit of Japanese Patent Application No. 2017-010297, filed on Jan. 24, 2017, in the Japanese Patent Office, and Korean Patent Application No. 10-2017-0103204, filed on Aug. 14, 2017, in the Korean Intellectual Property Office, and all the benefits accruing therefrom under 35 U.S.C. § 119, the contents of both of which are incorporated herein in their entirety by reference.

BACKGROUND

1. Field

The present disclosure relates to a composite cathode active material and a secondary battery including the same.

2. Description of the Related Art

Recently, all-solid-state secondary batteries using a solid electrolyte have attracted attention. As a solid electrolyte, a sulfide-based solid electrolyte with high lithium ion conductivity has been proposed. Nonetheless, there remains a need for an improved all-solid-state secondary battery, SUMMARY However, all-solid-state secondary batteries may not exhibit sufficiently improved characteristics. Thus, while not wanting to be bound by theory, it is understood that a reaction at the interface between a sulfide-based solid electrolyte and a cathode active material may not be sufficiently suppressed. In addition, a contribution to improvement in characteristics of all-solid-state secondary batteries, may involve the use of a film formation method using a complicated processes such as blasting, aerosol deposition, cold spraying, sputtering, chemical vapor deposition (CVD), spraying, and the like when coating an amorphous carbon film, and thus productivity thereof can be unsatisfactory.

Therefore, to address the above problems, provided is a composite cathode active material that further enhances characteristics of an all-solid-state secondary battery and has improved productivity, and a secondary battery including the same.

Additional aspects will be set forth in part in the description which follows and, in part, will be apparent from the description, or may be learned by practice of the presented embodiments.

According to an aspect of an embodiment, a composite cathode active material includes: a core particle; a first coating layer; and a second coating layer; wherein the core particle comprises a cathode active material, the first and second coating layers cover a surface of the core particle, the first coating layer comprises a first lithium-containing compound, wherein the first lithium-containing compound comprises zirconium, niobium, titanium, aluminum, or a combination thereof, the second coating layer comprises a second lithium-containing compound, wherein the second lithium-containing compound comprises germanium, niobium, and gallium, or a combination thereof, and the first lithium-containing compound is different from the second lithium-containing compound.

The first coating layer may be disposed on the surface of the core particle, and the second coating layer may be disposed on a surface of the first coating layer.

The first lithium-containing compound may be a lithium-containing oxide or a lithium-containing phosphorus oxide.

The first lithium-containing compound may include lithium zirconium oxide, lithium niobium oxide, lithium titanium oxide, lithium aluminum oxide, or a combination thereof.

The lithium zirconium oxide may include $aLi_2O\text{---}ZrO_2$ where $0.1 \leq a \leq 2$.

The first lithium-containing compound may be lithium zirconium phosphorus oxide or lithium titanium phosphorus oxide.

The second lithium-containing compound may include lithium germanium oxide, lithium niobium oxide, lithium gallium oxide, or a combination thereof.

The first coating layer may have a thickness ranging between about 1 nanometer and about 50 nanometers.

A total thickness of the first coating layer and the second coating layer may range between about 1 nanometer and about 500 nanometers.

The core particles may have a mean particle diameter of about 10 micrometers ($\mu$m) or less.

The core particles may include a lithium transition metal oxide having a layered halite structure.

The core particles may include $LiNi_xCo_yM_zO_2$ where M is aluminum or manganese, $0<x<1$, $0<y<1$, and $x+y+z=1$.

In an embodiment, $0.5 \leq x<1$.

For example, the core particles may satisfy the following condition: $0.7<x<1$.

According to an aspect of an embodiment, a cathode includes the composite cathode active material.

According to an aspect of an embodiment, a lithium secondary battery includes the cathode; an anode; and an electrolyte between the cathode and the anode.

The lithium secondary battery may be an all-solid-state lithium secondary battery, and the electrolyte may be a sulfide solid electrolyte.

The sulfide solid electrolyte may include at least sulfur and lithium, and further include phosphorus, silicon, boron, aluminum, germanium, zinc, gallium, indium, a halogen, or a combination thereof.

The sulfide solid electrolyte may include lithium sulfide and silicon sulfide, phosphorus sulfide, boron sulfide, or a combination thereof.

The sulfide solid electrolyte may include $Li_2S$ and $P_2S_5$.

The sulfide solid electrolyte may be in a form of a particle.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
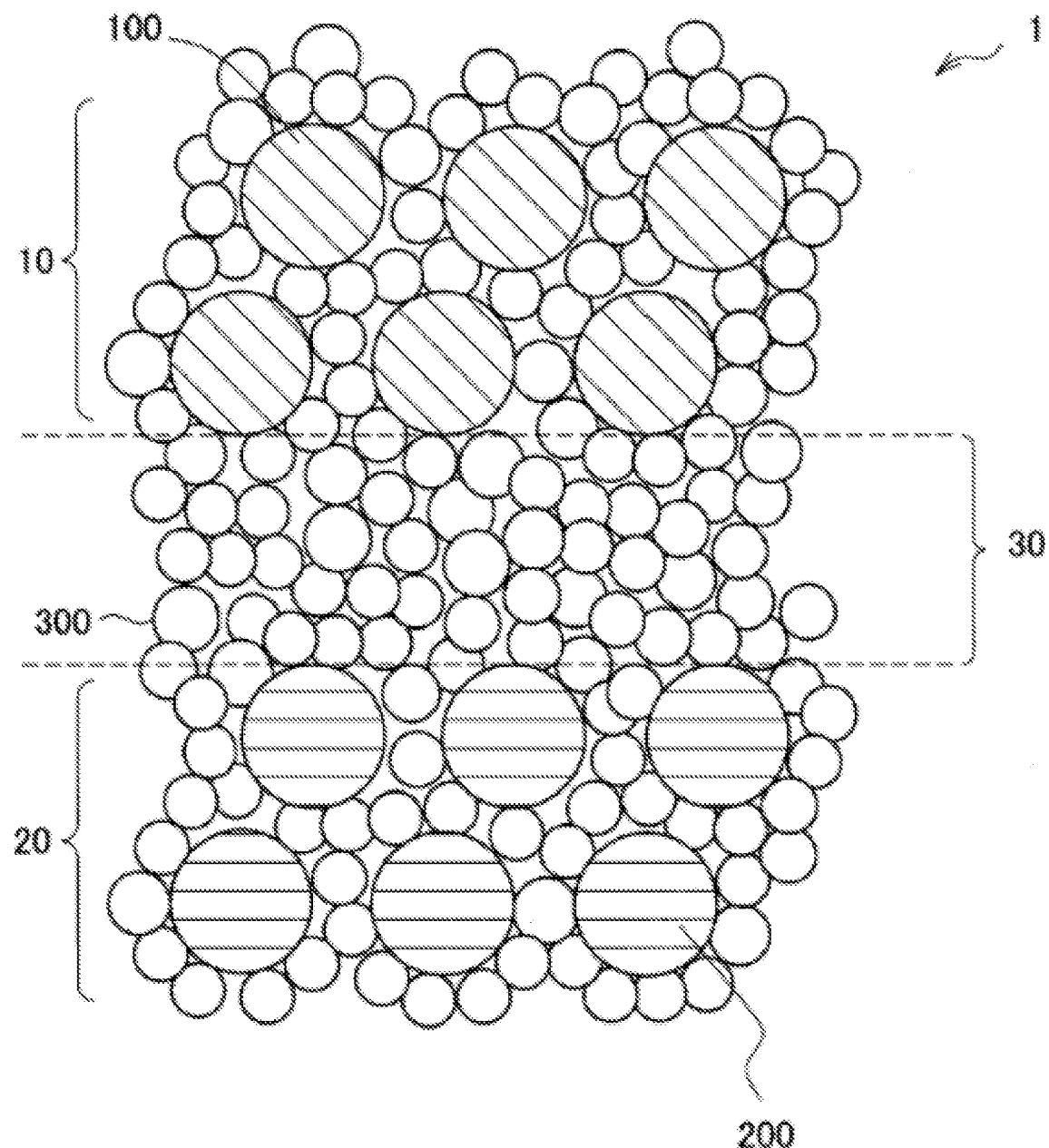
FIG. 1 is a schematic cross-sectional view illustrating an embodiment of a structure of a lithium secondary battery.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. Expressions such as "at least one of," when preceding a list of elements, modify the entire list of elements and do not modify the individual elements of the list.

Hereinafter, example embodiments will be described in detail with reference to the accompanying drawings. In addition, in the specification and the drawings, like reference numerals denote elements having substantially the same functions and configurations, and thus a detailed description thereof will be provided once.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The C rate is a discharge rate of a cell, and is obtained by dividing a total capacity of the cell by a total discharge period of time of 1 hour, e.g., a C rate for a battery having a discharge capacity of 1.6 ampere-hours would be 1.6 amperes.

While not wanting to be bound by theory, it is understood that a sulfide-based solid electrolyte reacts with cathode active material particles during charge, resulting in an interfacial resistance component of the cathode active material particles. In this case, interfacial resistance between the cathode active material particles and the solid electrolyte increases, and thus, conductivity of lithium ions is reduced, resulting in decreased output of an all-solid-state secondary battery. In addition, a reaction at the interface between the cathode active material and the solid electrolyte tends to cause high resistance, in particular, when a large load is applied to an all-solid-state secondary battery (e.g., when an all-solid-state secondary battery is charged to a high voltage or discharged at a high current).

To address the above-described problems, a method of forming a coating layer on a surface of cathode active material particles has been proposed. For example, coating a cathode active material particle with a $Li_2O$—$P_2O_5$—$Nb_2O_5$—$B_2O_3$—$GeO_2$-based glass, a coating cathode active material particle with an amorphous carbon film, coating a cathode active material particle with a solid electrolyte, a coating cathode active material particle with an oxide-based material including lithium zirconium oxide, coating a cathode active material particle with an inorganic material including tungsten, coating a cathode active material particle with a lithium (Li) ion conductive oxide having a boron (B)-oxygen (O)-silicon (Si) structure, a coating cathode active material particle with a glass including vanadium (V), phosphorus (P), tellurium (Te), or a combination thereof, a coating cathode active material particle with 50% or more of a coating layer formed of at least one material having a multiple anion structure such as $PO_4^{3-}$, $SiO_4^{4-}$, $GeO_4^{4-}$, $BO_3^{3-}$, or a combination thereof, coating a cathode active material particle with $Li_4SiO_4$—$Li_3BO_3$ and/or $LiNbO_3$, which is a Li ion conductive oxide, coating a cathode active material particle with $Li_3BO_3$, coating a cathode active material particle with a Li ion conductive oxide (containing Li and Ti), coating a cathode active material particle with a coating layer including a highly reactive element (e.g., aluminum (Al), cobalt (Co), manganese (Mn), or magnesium (Mg)) of a sulfide-based solid electrolyte, and coating a cathode active material particle with an oxide including a Group 13 element (Al, B, or gallium (Ga)) and having a four-coordinated structure are mentioned.

The coating may have a single-layered structure or may have a double-layered structure. In particular, a lower coating layer including a first Li ion conductor and an upper coating layer including a second Li ion conductor may be used. The first Li ion conductor may have a lithium ion conductivity of $1\times10^{-7}$ Siemens per centimeter (S/cm) or more, and the second Li ion conductor may comprise or consist of a Li-containing compound including B, Si, P, titanium (Ti), zirconium (Zr), Al, tungsten (W), or a combination thereof, and may have a multiple anion structure. A lower coating layer (a layer proximate to a cathode active material particle) may comprise an amorphous carbon and an upper coating layer may comprise a Li-containing oxide.

1. Summary of all-Solid-State Secondary Battery

An all-solid-state secondary battery according to an embodiment uses a solid electrolyte as an electrolyte. In addition, the all-solid-state secondary battery according to an embodiment is a so-called all-solid-state Li-ion battery in which lithium ions are transferred between a cathode and an anode.

In this case, a cathode active material and an electrolyte of the all-solid-state secondary battery using a solid electrolyte are in a solid state, and thus it is difficult for the electrolyte to permeate the inside of the cathode active material, as compared to a secondary battery using an organic solvent as an electrolyte. Thus, in the all-solid-state secondary battery, an area of an interface between the cathode active material and the electrolyte is likely to decrease, and it would be desirable to secure an improved path for transfer of lithium ions and electrons between the cathode active material and the solid electrolyte.

Therefore, for example, a technology for increasing the area of an interface between a cathode active material and a solid electrolyte by forming a cathode layer as a mixed layer of the cathode active material and the solid electrolyte has been proposed.

However, and while not wanting to be bound by theory, it is understood that when a sulfide-based solid electrolyte is used, a reaction occurs at the interface between the cathode active material and the solid electrolyte during charge, resulting in the generation of a resistive component, and, accordingly, interfacial resistance between the cathode active material and the solid electrolyte may increase. In addition, such a reaction at the interface between the cathode active material and the solid electrolyte tends to cause high resistance, in particular, when a large load is applied to an all-solid-state secondary battery (e.g., when an all-solid-state secondary battery is charged to a high voltage or discharged at a high current).

Thus, in an all-solid-state secondary battery using a sulfide-based solid electrolyte, it would be desirable to suppress the generation of a resistant component at an interface between a cathode active material and a solid electrolyte.

While not wanting to be bound by theory, it is understood that there are possibilities of degradation of a cathode active material (e.g., change in the number of atoms of a transition metal element included in the cathode active material) and degradation of a solid electrolyte at an interface between the cathode active material and the solid electrolyte. Therefore, cathode active material core particles may be coated with a coating layer for suppressing the degradation of the cathode active material and a coating layer for suppressing the degradation of the solid electrolyte in an all-solid-state secondary battery.

In an all-solid-state secondary battery 1 according to the present embodiment, a surface of a core particle 101 of a composite cathode active material 100 is covered by a first coating layer 102 and a second coating layer 103. According to such a configuration, direct contact between a plurality of core particles 101 and a solid electrolyte 300 is suppressed, and thus the generation of a resistance component at an interface between the core particles 101 and the solid electrolyte 300 may be suppressed.

In addition, the first and second coating layers 102 and 103 formed of a Li-containing compound suppress a reaction between the core particles 101 and the solid electrolyte 300 and have a lithium ion conductivity. Thus, the first and second coating layers 102 and 103 may secure a path for transfer of lithium ions between the core particles 101 and the solid electrolyte 300, and may enhance characteristics of the all-solid-state secondary battery 1.

According to an embodiment, the surface of the core particle 101 may be covered by the first coating layer 102, and a surface of the first coating layer 102 may be covered by the second coating layer 103. In this case, the characteristics of the all-solid-state secondary battery 1 may be improved as compared to a case in which a stacking order of the first coating layer 102 and the second coating layer 103 is opposite to the above order. That is, while not wanting to be bound by theory, it is understood that the first coating layer 102 may suppress the deterioration of the core particles 101, and the second coating layer 103 may suppress the deterioration of the solid electrolyte 300.

2. Structure of all-Solid-State Secondary Battery

Figure 2:
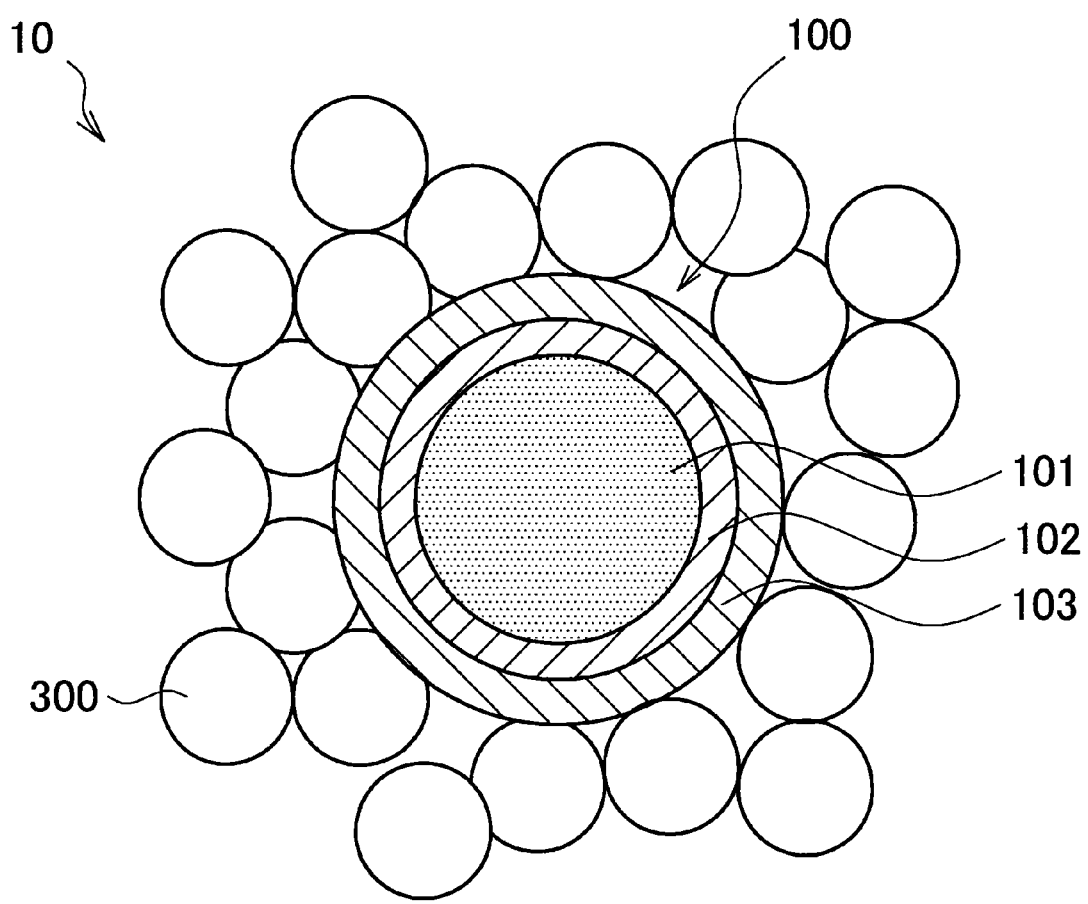
FIG. 2 is a schematic cross-sectional view illustrating an embodiment of a structure of a composite cathode active material.

Hereinafter, the structure of the all-solid-state secondary battery according to the present embodiment will be described with reference to FIGS. 1 and 2. FIG. 1 is a schematic cross-sectional view illustrating layer configurations of the all-solid-state secondary battery 1 according to the present embodiment. FIG. 2 is a schematic cross-sectional view illustrating the structure of a composite cathode active material 100 of the all-solid-state secondary battery 1 according to the present embodiment.

As illustrated in FIG. 1, the all-solid-state secondary battery 1 has a stacked structure including a cathode layer 10, an anode layer 20, and a solid electrolyte layer 30 positioned between the cathode layer 10 and the anode layer 20.

Cathode Layer

The cathode layer 10 includes the composite cathode active material 100 and the solid electrolyte 300. In addition, the cathode layer 10 may further include a conductive agent to facilitate electrical conductivity. The solid electrolyte 300 will be described below in a detailed description of the solid electrolyte layer 30.

In this regard, as illustrated in FIG. 2, the composite cathode active material 100 according to an embodiment includes the core particles 101, the first coating layer 102 covering the surface of the core particle 101, and the second coating layer 103 further covering the first coating layer 102.

However, the structure of the composite cathode active material 100 is not limited to the above example, and the stacking order of the first coating layer 102 and the second coating layer 103 may be changed. That is, the surface of the core particle 101 may be covered, e.g., completely covered or partially covered, by the second coating layer 103, and the surface of the second coating layer 103 may be covered, e.g., completely covered or partially covered, by the first coating layer 102.

Core Particles Including Cathode Active Material

The core particles 101 including a cathode active material have a greater charge/discharge potential than that of an anode active material included in anode particles 200, which will be described below, and are formed of a cathode material capable of reversibly intercalating and deintercalating lithium ions.

The core particles 101 may be any suitable core particles that are used in the art without limitation. For example, the core particles 101 may be formed of a compound represented by one of the following formulae: $Li_aA_{1-b}B'_bD_2$ where $0.90 \leq a \leq 1$ and $0 \leq b \leq 0.5$; $Li_aE_{1-b}B'_bO_{2-c}D_c$ where $0.90 \leq a \leq 1$, $0 \leq b \leq 0.5$, and $0 \leq c \leq 0.05$; $LiE_{2-b}B'_bO_{4-c}D_c$ where $0 \leq b \leq 0.5$ and $0 \leq c \leq 0.05$; $Li_aNi_{1-b-c}Co_bB'_cD_\alpha$ where $0.90 \leq a \leq 1$, $0 \leq b \leq 0.5$, $0 \leq c \leq 0.05$, and $0 < \alpha \leq 2$; $Li_aNi_{1-b-c}Co_bB'_cO_{2-\alpha}F_\alpha$ where $0.90 \leq a \leq 1$, $0 \leq b \leq 0.5$, $0 \leq c \leq 0.05$, and $0 < \alpha < 2$; $Li_aNi_{1-b-c}Co_bB'_cO_{2-\alpha}F'_2$ where $0.90 \leq a \leq 1$, $0 \leq b \leq 0.5$, $0 \leq c \leq 0.05$, and $0 < \alpha < 2$; $Li_aNi_{1-b-c}Mn_bB'_cD_\alpha$ where $0.90 \leq a \leq 1$, $0 \leq b \leq 0.5$, $0 \leq c \leq 0.05$, and $0 < \alpha \leq 2$; $Li_aNi_{1-b-c}Mn_bB'_cO_{2-\alpha}F'_\alpha$ where $0.90 \leq a \leq 1$, $0 \leq b \leq 0.5$, $0 \leq c \leq 0.05$, and $0 < \alpha < 2$; $Li_aNi_{1-b-c}Mn_bB'_cO_{2-\alpha}F'_2$ where $0.90 \leq a \leq 1$, $0 \leq b \leq 0.5$, $0 < c \leq 0.05$, and $0 < \alpha < 2$; $Li_aNi_bE_cG_dO_2$ where $0.90 \leq a \leq 1$, $0 \leq b \leq 0.9$, $0 \leq c \leq 0.5$, and $0.001 \leq d \leq 0.1$; $Li_aNi_bCO_cMn_dG_eO_2$ where $0.90 \leq a \leq 1$, $0 \leq b \leq 0.9$, $0 \leq c \leq 0.5$, $0 \leq d \leq 0.5$, and $0.001 \leq e \leq 0.1$; $Li_aNiG_bO_2$ where $0.90 \leq a \leq 1$ and $0.001 \leq b \leq 0.1$; $Li_aCoG_bO_2$ where $0.90 \leq a \leq 1$ and $0.001 \leq b \leq 0.1$; $Li_aMnG_bO_2$ where $0.90 \leq a \leq 1$ and $0.001 \leq b \leq 0.1$; $Li_aMn_2G_bO_4$ where $0.90 \leq a \leq 1$ and $0.001 \leq b \leq 0.1$; $QO_2$; $QS_2$; $LiQS_2$; $V_2O_5$; $LiV_2O_5$; $LiI'O_2$; $LiNiVO_4$; $Li_{(3-f)}J_2(PO_4)_3$ where $0 \leq f \leq 2$; $Li_{(3-f)}Fe_2(PO_4)_3$ where $0 \leq f \leq 2$; and $LiFePO_4$.

In the above formulae, A may be nickel (Ni), cobalt (Co), manganese (Mn), or a combination thereof; B' may be aluminum (Al), nickel (Ni), cobalt (Co), manganese (Mn), chromium (Cr), iron (Fe), magnesium (Mg), strontium (Sr), vanadium (V), a rare earth element, or a combination thereof; D may be oxygen (O), fluorine (F), sulfur (S), phosphorus (P), or a combination thereof; E may be cobalt (Co), manganese (Mn), or a combination thereof; F' may be fluorine (F), sulfur (S), phosphorus (P), or a combination thereof; G may be aluminum (Al), chromium (Cr), manganese (Mn), iron (Fe), magnesium (Mg), lanthanum (La), cerium (Ce), strontium (Sr), vanadium (V), or a combination thereof; Q may be titanium (Ti), molybdenum (Mo), manganese (Mn), or a combination thereof; I' may be chromium (Cr), vanadium (V), iron (Fe), scandium (Sc), yttrium (Y), or a combination thereof; and J may be vanadium (V), chromium (Cr), manganese (Mn), cobalt (Co), nickel (Ni), copper (Cu), or a combination thereof.

In addition, the above-listed compounds having a coating layer on their surfaces may also be used, or mixtures of the above-listed compounds and the compounds having a coating layer may be used. The coating layer may include a coating element compound such as an oxide, a hydroxide, an oxyhydroxide, an oxycarbonate, or a hydroxycarbonate. The compounds constituting the coating layer may be amorphous or crystalline. The coating element included in the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. The coating layer may be formed using any suitable coating method that does not adversely affect the physical properties of the cathode active material by using these coating elements in the above compounds (e.g., spray coating, dipping, or the like). The coating methods may be well understood by one of ordinary skill in the art, and thus a detailed description thereof is omitted.

In particular, the core particle 101 may be formed using a lithium salt such as lithium cobalt oxide (hereinafter, referred to as "LCO"), lithium nickel oxide, lithium nickel cobalt oxide, lithium nickel cobalt aluminum oxide (hereinafter, referred to as "NCA"), lithium nickel cobalt manganese oxide (hereinafter, referred to as "NCM"), lithium manganese oxide, lithium iron phosphate, or the like, nickel sulfide, copper sulfide, sulfur, iron oxide, vanadium oxide, or the like. These cathode active materials may be used alone, or a combination of two or more of these materials may also be used.

In addition, the core particle 101 may include a lithium salt of a transition metal oxide having a layered halite structure among the above-listed lithium salts. The term "layered" as used herein refers to a thin sheet form. In addition, the term "halite structure" as used herein refers to a sodium chloride structure, which is a type of crystal structure, and, in particular, a structure in which face-centered cubic lattices formed by cations and anions, respectively, are dislocated with respect to each other, e.g., separated from each other, by ½ of a corner of the unit lattice.

The lithium salt of the transition metal oxide having a layered halite structure may be, for example, a lithium salt of a ternary transition metal oxide represented by the formula $LiNi_xCo_yAl_zO_2$ ("NCA"), the formula $LiNi_xCo_yMn_zO_2$ ("NCM") where x, y, and z in $LiNi_xCo_yAl_zO_2$ and $LiNi_xCo_yMn_zO_2$ are each independently $0 < x < 1$, $0 < y < 1$, and $0 < z < 1$, wherein $x+y+z=1$, or the like.

When the core particles 101 includes the lithium salt of the ternary transition metal oxide having a layered halite structure, energy density and thermal stability of the all-solid-state secondary battery 1 may be enhanced.

In the composite cathode active material 100 according to the present embodiment, a structural change of the core particles 101 and a reaction at the interface between the core particles 101 and the solid electrolyte 300 are suppressed by the first coating layer 102 and the second coating layer 103, and thus characteristics of the all-solid-state secondary battery 1 may be further enhanced.

In addition, when the core particles 101 are formed of a lithium salt of a ternary transition metal oxide such as NCA, NCM, or the like and includes Ni as a cathode active material, the capacity density of the all-solid-state secondary battery 1 is increased, and thus elution of a metal of the cathode active material may be reduced in the charged state. Accordingly, the all-solid-state secondary battery 1 according to the present embodiment may have enhanced long-term reliability and cycle characteristics in the charged state. In particular, when the core particles 101 includes the NCA or the NCM where $0.5 \leq x < 1$, for example, $0.7 < x < 1$, and a large content of Ni, a high-capacity battery may be manufactured.

In this regard, the core particles 101 may have a particle form such as a spherical form, an oval-spherical form, or the like. In addition, the core particles 101 may have a mean particle diameter ranging between, for example, about 0.1 micrometers (μm) and about 50 μm. For example, the mean particle diameter of the core particles 101 may range between about 0.1 µm and about 20 µm. For example, the mean particle diameter of the core particles 101 may range between about 0.1 µm and about 10 µm. As used herein, the term "mean particle diameter" refers to a number average diameter (D50) of the particle size distribution of particles obtained by scattering or the like, and the mean particle diameter may be measured using a particle size distribution meter, or the like.

In addition, the amount of the core particles 101 in the cathode layer 10 may range, for example, between about 10 weight percent (wt %) and about 99 wt %, for example, between about 20 wt % and about 90 wt %.

First Coating Layer

According to an embodiment, the first coating layer 102 covers the surfaces of the core particles 101. In particular, in the present embodiment, a reaction occurring at the interface between the core particles 101 and the solid electrolyte 300 may be suppressed by the first coating layer 102 formed of a compound described below. In particular, while not wanting to be bound by theory, it is understood that degradation of the core particles 101 may be effectively suppressed by the first coating layer 102. In addition, the first coating layer 102 may have lithium ion conductivity.

The first coating layer 102 includes a first Li-containing compound.

The first Li-containing compound may be, for example, a Li-containing oxide or a Li-containing phosphorus oxide. For example, the Li-containing oxide may include lithium zirconium oxide (Li—Zr—O), lithium niobium oxide (Li—Nb—O), lithium titanium oxide (Li—Ti—O), lithium aluminum oxide (Li—Al—O), or a combination thereof.

In this case, the lithium zirconium oxide may include, for example, $aLi_2O$—$ZrO_2$ where $0.1 \leq a \leq 2.0$. The $aLi_2O$—$ZrO_2$ (hereinafter, referred to as "LZO") compound is a composite oxide of $Li_2O$ and $ZrO_2$ and is chemically stable, and thus, when the first coating layer 102 formed of such LZO is used, the reaction between the core particles 101 and the solid electrolyte 300 may be further suppressed. In the LZO, $0.1 \leq a \leq 2.0$. When a is within the above range, characteristics of the all-solid-state secondary battery 1 may be further enhanced.

In addition, when the first coating layer 102 is formed of LZO, the core particles 101 may be covered by the first coating layer 102 such that a molar ratio (i.e., a coating amount of LZO) of LZO to the core particles 101 ranges between about 0.1 mole percent (mol %) and about 2.0 mol %. When the coating amount of LZO of the first coating layer 102 is within the above range, discharge capacity and load characteristics may be further enhanced. Meanwhile, when the coating amount of LZO of the first coating layer 102 is less than 0.1 mol %, an effect of suppressing the reaction between the core particles 101 and the solid electrolyte 300 may be insufficient. In addition, when the coating amount of LZO of the first coating layer 102 is greater than 2.0 mol %, lithium ion conductivity between the core particles 101 and the solid electrolyte 300 may be reduced.

In addition, the Li-containing phosphorus oxide may be, for example, lithium titanium phosphorus oxide (Li—Ti—$PO_4$) or lithium zirconium phosphorus oxide (Li—Zr—$PO_4$).

The first coating layer 102 may have a thickness ranging, for example, between about 1 nanometer (nm) and 50 nm. For example, the thickness of the first coating layer 102 may range between about 5 nm and about 30 nm. When the thickness of the first coating layer 102 is within the above range, characteristics of the all-solid-state secondary battery 1 may be enhanced without a decrease in lithium ion conductivity. Meanwhile, when the thickness of the first coating layer 102 is less than 1 nm, it may be difficult to sufficiently suppress the reaction between the core particles 101 and the solid electrolyte 300. In addition, when the thickness of the first coating layer 102 is greater than 50 nm, lithium ion conductivity between the core particles 101 and the solid electrolyte 300 may be reduced.

The above-described thickness of the first coating layer 102 may be measured using a cross-sectional image taken by a transmission electron microscope ("TEM"). The thickness of the second coating layer 103, which will be described below, may be measured using the same method as that used to measure the thickness of the first coating layer 102.

Second Coating Layer

According to an embodiment, the second coating layer 103 covers the first coating layer 102. In particular, in the present embodiment, the reaction occurring at the interface between the core particles 101 and the solid electrolyte 300 may be suppressed by the second coating layer 103 formed of a compound described below. In particular, while not wanting to be bound by theory, it is understood that degradation of the solid electrolyte 300 may be effectively suppressed by the second coating layer 103. In addition, the second coating layer 103 may have lithium ion conductivity.

The second coating layer 103 includes a second Li-containing compound, and the second Li-containing compound includes germanium (Ge), niobium (Nb), gallium (Ga), or a combination thereof.

The second Li-containing compound may include lithium germanium oxide (Li—Ge—O), lithium niobium oxide (Li—Nb—O), lithium gallium oxide (Li—Ga—O), or a combination thereof.

In this regard, compositions of the first coating layer 102 and the second coating layer 103, i.e., the first Li-containing compound and the second Li-containing compound, are different from each other, and, accordingly, characteristics of the all-solid-state secondary battery 1 may be further enhanced.

In addition, a total thickness of the first coating layer 102 and the second coating layer 103 may range between about 1 nm and about 500 nm, for example, between about 15 nm and about 70 nm. When the total thickness of the first coating layer 102 and the second coating layer 103 is within the above range, the reaction between the core particles 101 and the solid electrolyte 300 may be further suppressed without a decrease in lithium ion conductivity. Meanwhile, when the total thickness of the first coating layer 102 and the second coating layer 103 is less than 1 nm, an effect of suppressing the reaction between the core particles 101 and the solid electrolyte 300 may be insufficient. In addition, when the total thickness of the first coating layer 102 and the second coating layer 103 is greater than 500 nm, lithium ion conductivity between the core particles 101 and the solid electrolyte 300 may be reduced.

In addition, the first coating layer 102 and the second coating layer 103 may cover at least a portion of the core particles 101. That is, the entire surfaces of the core particles 101 may be covered by the first coating layer 102 and the second coating layer 103, or the surfaces of the core particles 101 may be partially covered by the first coating layer 102 and the second coating layer 103.

In addition, the cathode layer 10 may include an appropriate amount of an additive, e.g., a conductive agent, a binder, a filler, a dispersant, an ion conductive agent, or the like, in addition to the above-described composite cathode active material 100 and the solid electrolyte 300.

The conductive agent that may be used for forming the cathode layer 10 may be, for example, graphite, carbon black, acetylene black, Ketjen black, carbon fiber, metallic powder, or the like. In addition, the binder that may be used for forming the cathode layer 10 may be, for example, polytetrafluoroethylene, polyvinylidene fluoride, polyethylene, or the like. In addition, the filler, the dispersant, and the ion conductive agent that may be used for forming the cathode layer 10 may be materials used in electrodes of all-solid-state secondary batteries.

Anode Layer

As illustrated in FIG. 1, the anode layer 20 includes the anode particles 200 and the solid electrolyte 300. In addition, the solid electrolyte 300 will be described in the description of the solid electrolyte layer 30.

The anode particles 200 have a charge/discharge potential less than that of the cathode active material included in the core particles 101, and are formed of an anode active material that is alloyable with lithium or is capable of reversibly intercalating and deintercalating lithium.

The anode active material may be any suitable anode active material for a lithium secondary battery that may be used in the art.

For example, the anode active material may include lithium, a metal alloyable with lithium, a transition metal oxide, a non-transition metal oxide, a material capable of doping or undoping lithium, a carbonaceous material, or a combination thereof.

Examples of the metal alloyable with lithium include, but are not limited to, silicon (Si), tin (Sn), aluminum (Al), indium (In), germanium (Ge), lead (Pb), bismuth (Bi), antimony (Sb), Si—Y' alloys where Y' is an alkaline metal, an alkaline earth metal, a Group 13 element, a Group 14 element, a transition metal, a rare earth element, or a combination thereof and is not Si, and Sn—Y alloys where Y' is an alkaline metal, an alkaline earth metal, a Group 13 element, a Group 14 element, a transition metal, a rare earth element, or a combination thereof and is not Sn. The element Y' may be magnesium (Mg), calcium (Ca), strontium (Sr), radium (Ra), barium (Ba), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or a combination thereof.

Non-limiting examples of the transition metal oxide include tungsten oxide, molybdenum oxide, titanium oxide, lithium titanium oxide, vanadium oxide, and lithium vanadium oxide.

The non-transition metal oxide may be, for example, $SnO_2$, $SiO_x$ where $0<x<2$, or the like.

Non-limiting examples of the material capable of doping or undoping lithium include Sn, $SnO_2$, and Sn—Y alloys where Y is an alkaline metal, an alkaline earth metal, a Group 11 element, a Group 12 element, a Group 13 element, a Group 14 element, a Group 15 element, a Group 16 element, a transition metal, a rare earth element, or a combination thereof and is not Sn. The element Y may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or a combination thereof.

The carbonaceous material may be crystalline carbon, amorphous carbon, or a mixture thereof. The carbonaceous material may be natural graphite, artificial graphite, graphite carbon fiber, resin calcined carbon, pyrolysis vapor-grown carbon, coke, mesocarbon microbeads ("MCMBs"), furfuryl alcohol resin calcined carbon, polyacene, pitch-based carbon fiber, vapor-grown carbon fiber, soft carbon (low-temperature calcined carbon) or hard carbon, mesophase pitch carbide, or the like. These materials may be used alone as an anode active material 201, or a mixture of two or more of these materials may be used.

The carbonaceous material may have an amorphous form, a plate form, a flake form, a spherical form, a fibrous form, or a mixed form thereof.

In addition, the anode layer 20 may include an additive, for example, a conductive agent, a binder, a filler, a dispersant, an ion conductive agent, and the like, in addition to the above-described anode particles 200 and the solid electrolyte 300.

In addition, the additive included in the anode layer 20 may be the same as that included in the cathode layer 10.

Solid Electrolyte Layer

The solid electrolyte layer 30 includes the solid electrolyte 300 formed between the cathode layer 10 and the anode layer 20.

The solid electrolyte 300 is formed of a sulfide solid electrolyte material. The sulfide solid electrolyte material includes at least S and Li, and further includes P, Si, B, Al, Ge, Zn, Ga, In, a halogen, or a combination thereof.

In particular, the solid electrolyte 300 includes lithium sulfide as the sulfide solid electrolyte material, and may include, as a second component, silicon sulfide, phosphorus sulfide, boron sulfide, or a combination thereof. For example, the solid electrolyte 300 may include $Li_2S$—$P_2S_5$.

The sulfide solid electrolyte material may include a sulfide such as $SiS_2$, $GeS_2$, $B_2S_3$, or the like, in addition to $Li_2S$—$P_2S_5$, which may have a greater lithium ion conductivity than that of other inorganic compounds. In addition, an inorganic solid electrolyte prepared by adding $Li_3PO_4$, a halogen, a halogen compound, $Li_{2+2x}Zn_{1-x}GeO_4$ ("LISICON"), $Li_{3+y}PO_{4-x}N_x$ ("LIPON"), $Li_{3.25}Ge_{0.25}P_{0.75}S_4$ ("Thio-LISICON"), $Li_2O$—$Al_2O_3$—$TiO_2$—$P_2O_5$ ("LATP"), or the like to an inorganic solid electrolyte of $Li_2S$—$P_2S_5$, $SiS_2$, $GeS_2$, $B_2S_3$, or a combination thereof may be as used as a sulfide solid electrolyte.

Non-limiting examples of the sulfide solid electrolyte material include $Li_2S$—$P_2S_5$; $Li_2S$—$P_2S_5$—LiX where X is a halogen element; $Li_2S$—$P_2S_5$—$Li_2O$; $Li_2S$—$P_2S_5$—$Li_2O$—LiI; $Li_2S$—$SiS_2$; $Li_2S$—$SiS_2$—LiI; $Li_2S$—$SiS_2$—LiBr; $Li_2S$—$SiS_2$—LiCl; $Li_2S$—$SiS_2$—$B_2S_3$—LiI; $Li_2S$—$SiS_2$—$P_2S_5$—LiI; $Li_2S$—$B_2S_3$; $Li_2S$—$P_2S_5$-ZmSn where m and n are positive numbers, and Z is Ge, Zn, or G; $Li_2S$—$GeS_2$; $Li_2SSiS_2$—$Li_3PO_4$; and $Li_2S$—$SiS_2$-$Li_pMO_q$ where p and q are positive numbers, and M is P, Si, Ge, B, Al, Ga, or In. In this regard, the sulfide-based solid electrolyte material is prepared by treating a raw starting material (e.g., $Li_2S$, $P_2S_5$, or the like) of a sulfide-based solid electrolyte material by a melt quenching method, a mechanical milling method, or the like. In addition, a calcination process may be performed after treatment.

According to an embodiment, a solid electrolyte including at least S, P, and Li as constitutional elements among the above-listed sulfide solid electrolyte materials, e.g., $Li_2S$—$P_2S_5$, may be used as the solid electrolyte 300.

When the sulfide solid electrolyte material constituting the solid electrolyte 300 includes $Li_2S$—$P_2S_5$, a mixing molar ratio of $Li_2S$ to $P_2S_5$ may range, for example, from about 50:50 to about 90:10.

The solid electrolyte 300 may have a particle form, for example, a spherical form, an oval-spherical form, or the like. The particle diameter of the solid electrolyte 300 is not particularly limited, and the solid electrolyte 300 may have a mean particle diameter ranging, for example, between about 0.01 μm and about 30 μm, for example, between about 0.1 μm and about 20 μm. As described above, the mean particle diameter refers to a number average diameter (D50) of the particle size distribution of particles obtained by scattering, or the like.

The structure of the all-solid-state secondary battery 1 according to the present embodiment has been described in detail.

3. Method of Manufacturing all-Solid-State Secondary Battery

Hereinafter, a method of manufacturing the all-solid-state secondary battery 1 according to the present embodiment will be described. The all-solid-state secondary battery 1 according to the present embodiment may be manufactured by forming the cathode layer 10, the anode layer 20, and the solid electrolyte layer 30, and then stacking the layers.

Formation of Cathode Layer

First, the composite cathode active material 100 is prepared by sequentially forming the first coating layer 102 and the second coating layer 103 on surfaces of the core particles 101.

The core particles 101 may be prepared using a known method. For example, in a case in which the core particles 101 are formed using NCA, first, $Ni(OH)_2$ powder, $Co(OH)_2$ powder, $Al_2O_3 \cdot H_2O$ powder, and $LiOH \cdot H_2O$ powder may be mixed so that a composition ratio of the resulting mixture coincides with that of NCA produced, and the resulting mixture may be pulverized by ball milling, or the like. Next, the pulverized raw material powder mixture may be mixed with a dispersant, a binder, and the like to adjust viscosity, and the like, and then the final mixture may be molded into a sheet form. In addition, the sheet-type molded product may be calcined at a given temperature, and the resulting molded product may be pulverized using a net (mesh) or the like, thereby completing the preparation of the core particles 101. In this case, the particle diameter of the core particles 101 may be adjusted by varying the mesh of the net used to pulverize the molded product.

Subsequently, the first coating layer 102 is formed on the surfaces of the prepared core particles 101. The first coating layer 102 is formed on the surfaces of the cathode active material particles 101 using the following method. That is, an alkoxide of a metal element constituting the first coating layer 102 is mixed by stirring in a solvent such as alcohol, or the like to prepare a solution. Subsequently, the prepared solution is sprayed onto the surfaces of the core particles 101 and dried. The spraying process may be performed using, for example, a tumbling fluidized bed granulating coater (FD-MP-01E) manufactured by POWEREX Co., Ltd. Thereafter, the core particles 101 obtained by spraying and drying the solution are calcined. Through the above-described processes, the first coating layer 102 is formed on the surfaces of the core particles 101.

Meanwhile, the second coating layer 103 may be formed on the first coating layer 102 using the same method as that used to form the first coating layer 102. In addition, the first coating layer 102 and the second coating layer 103 may be formed using other methods in addition to the above-described method.

By using the above-described method, the composite cathode active material 100 in which the first coating layer 102 and the second coating layer 103 are sequentially formed on the surfaces of the core particles 101 may be prepared.

Subsequently, the prepared composite cathode active material 100, the solid electrolyte 300 prepared using the following method, and a variety of additives are mixed, and the resulting mixture is added to a solvent such as water, an organic solvent, or the like to form a slurry or a paste. In addition, the obtained slurry or paste may be applied on a current collector, followed by drying and pressing, thereby completing the formation of the cathode layer 10.

Formation of Anode Layer

The anode layer 20 may be formed using the same method as that used to form the cathode layer 10. In particular, the anode particles 200, the solid electrolyte 300 prepared using the following method, and a variety of additives are mixed, and the resulting mixture is added to a solvent such as water, an organic solvent, or the like to form a slurry or a paste. In addition, the obtained slurry or paste may be applied on a current collector, followed by drying and pressing, thereby completing the formation of the anode layer 20. In addition, the anode particles 200 may be prepared using an anode active material by a known method.

In this regard, the current collector used in the cathode layer 10 and the anode layer 20 may be, for example, a plate or foil formed of In, Cu, Mg, stainless steel, Ti, Fe, Co, Ni, Zn, Al, Ge, Li, or an alloy thereof. In addition, instead of using the current collector, a mixture of the composite cathode active material 100 or the anode particles 200 and a variety of additives may be subjected to compaction molding into a pellet form, thereby forming the cathode layer 10 or the anode layer 20.

Formation of Solid Electrolyte Layer

The solid electrolyte layer 30 may be formed using the solid electrolyte 300 formed of a sulfide-based solid electrolyte material.

First, a sulfide-based solid electrolyte material is prepared by melt quenching or mechanical milling.

For example, when the melt quenching is used, $Li_2S$ and $P_2S_5$ may be mixed in certain amounts to prepare a pellet form, and the prepared pellet form may be allowed to react in a vacuum state at a predetermined reaction temperature, followed by quenching, thereby completing the preparation of the sulfide-based solid electrolyte material. In addition, the reaction temperature of the mixture of $Li_2S$ and $P_2S_5$ ranges from, for example, about 400° C. to about 1,000° C., for example, about 800° C. to about 900° C. In addition, reaction time may range from, for example, about 0.1 hours to about 12 hours, for example, about 1 hour to about 12 hours. In addition, a quenching temperature of the reaction product may be about 10° C. or less, for example, about 0° C. or less, and a quenching rate of the reaction product may range from about 1° C./second (sec) to about 10,000° C./sec, for example, about 1° C./sec to about 1,000° C./sec.

In addition, when mechanical milling is used, $Li_2S$ and $P_2S_5$ may be mixed in certain amounts and allowed to react while stirred using a ball mill or the like, thereby preparing a sulfide-based solid electrolyte material. In addition, a stirring rate and stirring time of the mechanical milling method are not particularly limited, but the faster the stirring rate, the faster the production rate of the sulfide-based solid electrolyte material, and the longer the stirring time, the greater the conversion rate of raw materials into the sulfide-based solid electrolyte material.

Thereafter, the sulfide-based solid electrolyte material obtained by melt quenching or mechanical milling may be heat-treated at a predetermined temperature and then pulverized, thereby preparing the solid electrolyte 300 having a particle shape.

Subsequently, the solid electrolyte 300 obtained using the method may be deposited using a film formation method, for example, by blasting, aerosol deposition, cold spraying, sputtering, chemical vapor deposition ("CVD"), spraying, or the like, thereby preparing the solid electrolyte layer 30. In addition, the solid electrolyte layer 30 may be formed by pressing the solid electrolyte 300. In addition, the solid electrolyte layer 30 may be formed by mixing the solid electrolyte 300, a solvent, and a binder or a support and pressing the resulting mixture. In this case, the solvent or the support is added to reinforce the strength of the solid electrolyte layer 30 or prevent short-circuit of the solid electrolyte 300.

Manufacture of all-Solid-State Secondary Battery

In addition, the cathode layer 10, the anode layer 20, and the solid electrolyte layer 30, which have been formed using the above-described methods, are stacked such that the solid electrolyte layer 30 is interposed between the cathode layer 10 and the anode layer 20, and the resulting structure is pressed, thereby manufacturing the all-solid-state secondary battery 1 according to the present embodiment.

Hereinafter, the present disclosure will be described in further detail with reference to the following examples and comparative examples. However, these examples are provided for illustrative purposes only and are not intended to be limiting.

EXAMPLES

Example 1

Preparation of Cathode Active Material $LiNi_{0.8}Co_{0.1}Mn_{0.1}O_2$ ("NCM") was used as the core particles 101. The mean particle diameter of the core particles 101 was measured by scattering and, as a result, was 7 micrometers ($\mu m$). Subsequently, the surfaces of the core particles 101 were coated with a mixed solution prepared by mixing lithium methoxide and zirconium propoxide with ethanol. In particular, the amount of the mixed solution was adjusted such that a coating amount of $Li_2O$—$ZrO_2$ ("LZO") with respect to the NCM was 0.5 mole percent (mol %) based on the total amount of the NCM. Subsequently, the surfaces of the core particles 101 were coated with the mixed solution using a tumbling fluidized bed granulating coater (FD-MP-01E) manufactured by POWEREX Co., Ltd. In particular, the mixed solution was sprayed onto the surfaces of the core particles 101 under conditions: 500 grams (g) of the core particles 101, an air supply temperature of 90° C., an air supply flow rate of 0.23 cubic meters per hour ($m^3/h$), a rotational speed of a rotor of 400 rotations per minute (rpm), an air flow rate of an atomizer of 50 normal liters per minute (Nl/min), and a spraying rate of about 5 grams per minute (g/min). Thereafter, the core particles 101 coated with the mixed solution were dried. The surface-coated core particles 101 were calcined at 350° C. for 1 hour in an air atmosphere to form the first coating layer 102 including LZO on the surfaces of the core particles 101.

Subsequently, a mixed solution was prepared by mixing lithium methoxide and germanium propoxide with ethanol. In particular, the amount of the mixed solution was adjusted such that a coating amount of $Li_2O$—$GeO_2$ (LGeO) with respect to the NCM was 0.5 mol % based on the total amount of the NCM. Thereafter, the second coating layer 103 including LGeO was formed on the first coating layer 102 using the same treatment method as used above. Through the above-described processes, the composite cathode active material 100, in which the first coating layer 102 and the second coating layer 103 were formed on each core particle 101, i.e., a double layer coated composite cathode active material, was obtained. Subsequently, many cathode active materials were observed using cross-sectional images acquired by a TEM and, as a result, the thickness of the first coating layer 102 ranged from 5 $\mu m$ to 30 $\mu m$, and a total thickness of the first coating layer 102 and the second coating layer 103 ranged from 15 $\mu m$ to 70 $\mu m$.

Manufacture of all-Solid-State Secondary Battery

First, reagents $Li_2S$, $P_2S_5$, and LiCl as starting materials of a sulfide-based electrolyte material were weighed so as to obtain a material with a composition of $Li_6PS_5Cl$. Subsequently, the reagents were subjected to mechanical milling treatment using a planetary ball mill while mixed for 20 hours. The mechanical milling treatment was performed at a rotational speed of 380 rpm and in an argon atmosphere.

800 milligrams (mg) of a powder sample with the composition of $Li_6PS_5Cl$ obtained by mechanical milling treatment was pressed (pressure: 400 megapascals per square centimeter ($MPa/cm^2$)) to obtain a pellet having a diameter of 13 millimeters (mm) and a thickness of about 0.8 mm. The obtained pellet was covered by gold foil, and put into a carbon crucible to fabricate a sample for heat treatment. The obtained sample for heat treatment was vacuum-encapsulated in a quartz glass tube. Subsequently, the sample for heat treatment was put into an electric furnace, and the temperature of the electric furnace was raised from room temperature to 550° C. at a heating rate of 1.0° C./minute (min). Subsequently, the sample for heat treatment was heat-treated at 550° C. for 6 hours. Thereafter, the resulting sample was cooled to room temperature at a cooling rate of 1.0° C./min. The sample collected after heat treatment was pulverized by an agate mortar. Crystal analysis was performed on the pulverized sample by X-ray diffraction, and it was confirmed whether desired argyrodite crystals were generated. In this case, the heat-treated sample was used as the solid electrolyte 300.

Subsequently, the prepared composite cathode active material 100, the solid electrolyte 300, and carbon nanofibers ("CNFs") as a conductive agent were mixed in a weight ratio of 83:15:3 to manufacture a cathode mixture. 10 milligrams (mg) of the cathode mixture, 150 mg of the solid electrolyte 300, and metal Li as an anode were stacked in this order, and the resulting structure was pressed at a pressure of 3 tons per square centimeter ($ton/cm^2$) to obtain a test cell.

Evaluation of Load Characteristics

The obtained test cell was charged at a constant current of 0.05 C and 25° C. up to a maximum voltage of 4.0 volts (V), and then discharged at a constant current of 0.05 C up to a discharge cut-off voltage of 2.5 V. Then, discharge capacity of the test cell was measured, and denoted as initial discharge capacity. Subsequently, the test cell was discharged at 0.05 C, 0.5 C, and 1 C to evaluate rate characteristics. In addition, a ratio of discharge capacity at 1 C to the initial discharge capacity was denoted as an index of load characteristics. The greater the ratio, the smaller the internal resistance of a battery, which may be regarded as a battery with improved load characteristics.

Cycle Lifespan Test

The obtained test cell was charged at a constant current of 0.05 C up to a maximum voltage of 4.0 V, and discharged at 0.5 C up to a discharge cut-off voltage of 2.5 V, and this cycle of charging and discharging was repeated 50 times. In addition, a ratio of discharge capacity at the $50^{th}$ cycle to discharge capacity at the $1^{st}$ cycle was denoted as a discharge capacity retention ratio. The discharge capacity retention ratio is a parameter for cycle characteristics, and the greater the ratio, the more improved the cycle characteristics. The results thereof are shown in Table 1 below. In addition, unit of the initial discharge capacity shown in Tables 1 to 4 below is milliamp-hours per gram (mAh/g).

Example 2

Preparation of Cathode Active Material

The NCM used in Example 1 was used as the core particles 101. Subsequently, the first coating layer 102 including LZO was formed on the surfaces of the core particles 101 by the same treatment as used above.

Subsequently, a mixed solution was prepared by mixing lithium methoxide and niobium ethoxide with ethanol. In particular, the amount of the mixed solution was adjusted such that a coating amount of $Li_2O$—$Nb_2O_5$(LNbO) with respect to the NCM was 0.5 mol % based on the total amount of the NCM. Subsequently, the second coating layer 103 including LNbO was formed on the first coating layer 102 by the same treatment as that used in Example 1. Then, many cathode active materials were observed using cross-sectional images acquired by a TEM and, as a result, the thickness of the first coating layer 102 ranged from 5 μm to 30 μm, and a total thickness of the first coating layer 102 and the second coating layer 103 ranged from 15 μm to 70 μm. Thereafter, a test cell was fabricated by the same treatment as that used in Example 1, and load characteristics and cycle lifespan of the test cell were evaluated. The results thereof are shown in Table 1 below.

Comparative Example 1

The same treatment as that performed in Example 1 was performed, except that the second coating layer 103 was not formed. That is, in Comparative Example 1, only a coating layer including LZO was formed on the surfaces of the core particles 101. The results thereof are shown in Table 1 below.

Comparative Example 2

The same treatment as that performed in Example 1 was performed, except that the first coating layer 102 was not formed. That is, in Comparative Example 2, only a coating layer including LGeO was formed on the surfaces of the core particles 101. The results thereof are shown in Table 1 below.

Comparative Example 3

The NCM used in Example 1 was used as the core particles 101. Subsequently, the first coating layer 102 including LGeO was formed on the surfaces of the core particles 101 by the same treatment as that used in Example 1. Subsequently, the second coating layer 103 including LZO was formed on the first coating layer 102 by the same treatment as that performed in Example 1. Thereafter, a test cell was fabricated by the same treatment as that performed in Example 1, and load characteristics and cycle lifespan of the test cell were evaluated. The results thereof are shown in Table 1 below.

Comparative Example 4

The NCM used in Example 1 was used as the core particles 101. Subsequently, the first coating layer 102 including LNbO was formed on the surfaces of the core particles 101 by the same treatment as that performed in Example 2. Subsequently, a mixed solution was prepared by mixing lithium methoxide and titanium isopropoxide with ethanol. In particular, the amount of the mixed solution was adjusted such that a coating amount of $Li_2Ti_2O_5$ ("LTO") with respect to the NCM was 0.5 mol % based on the total amount of the NCM. Subsequently, the second coating layer 103 including LTO was formed on the first coating layer 102 by the same treatment as that performed in Example 1. Thereafter, a test cell was fabricated by the same treatment as that performed in Example 1, and load characteristics of the test cell were evaluated. The results thereof are shown in Table 1 below. In addition, in Comparative Example 4, rate characteristics were deficient, and thus cycle lifespan was not evaluated.

Comparative Example 5

The NCM used in Example 1 was used as the core particles 101. Subsequently, a mixed solution of lithium methoxide, zirconium propoxide, germanium propoxide, and ethanol were prepared. In particular, the amount of the mixed solution was adjusted such that a coating amount of $Li_2O$—$ZrO_2$—$GeO_2$ ("LZGeO") with respect to the NCM was 0.5 mol % based on the total amount of the NCM. Subsequently, a coating layer including LZGeO was formed as the first coating layer 102 by the same treatment as that performed in Example 1. Thereafter, a test cell was fabricated by the same treatment as that performed in Example 1, and load characteristics of the test cell were evaluated. The results thereof are shown in Table 1 below. In addition, in Comparative Examples 4 and 5, rate characteristics were deficient, and thus cycle lifespan was not evaluated.

TABLE 1

| | Initial discharge capacity (mAh/g) | Rate characteristics (1 C/0.05 C) | Cycle characteristics |
|---|---|---|---|
| Example 1 | 153 | 0.80 | 0.98 |
| Example 2 | 152 | 0.80 | 0.98 |
| Comparative Example 1 | 145 | 0.80 | 0.94 |
| Comparative Example 2 | 147 | 0.80 | 0.94 |
| Comparative Example 3 | 149 | 0.80 | 0.94 |
| Comparative Example 4 | 147 | 0.60 | — |
| Comparative Example 5 | 149 | 0.75 | — |

Evaluation

The test cells of Examples 1 and 2 exhibited improved initial discharge capacity, improved rate characteristics, and improved cycle characteristics. Compared to this, at least one of the initial discharge capacity, the rate characteristics, and cycle characteristics of the test cells of Comparative Examples 1 to 5 was deteriorated. In particular, a structure of the cathode active material of Comparative Example 3 is different from that of Example 1 in that the stacking orders of the first coating layer 102 and the second coating layer 103 are opposite to each other, but the test cell of Comparative Example 3 exhibited an initial discharge capacity less than that of the case of Example 1. In addition, a structure of the cathode active material of Comparative Example 4 is different from that of Example 1 in that the stacking orders of the first coating layer 102 and the second coating layer 103 are opposite to each other, but the test cell of Comparative Example 4 exhibited a smaller initial discharge capacity and inferior rate characteristics compared to those of the Examples. In the case of Comparative Example 5, the single layer was formed of the same constitutional elements as those of the first coating layer 102 and the second coating layer 103 of the case of Example 1, but the test cell of Comparative Example 5 also exhibited low initial discharge capacity.

Example 3

A test cell fabricated in the same manner as in Example 1 was charged at a constant current of 0.05 C and 25° C. up to a maximum voltage of 4.1 V, and then discharged at a constant current of 0.05 C up to a discharge cut-off voltage of 2.5 V. Then, discharge capacity of the test cell was measured, and denoted as initial discharge capacity. Subsequently, the test cell was discharged at 0.05 C, 0.5 C, and 1 C to evaluate rate characteristics. In addition, a ratio of discharge capacity at 1 C to the initial discharge capacity was denoted as an index of load characteristics. In addition, to evaluate cycle lifespan, the obtained test cell was charged at a constant current of 0.05 C and 25° C. up to a maximum voltage of 4.0 V, and discharged at 0.5 C up to a discharge cut-off voltage of 2.5 V, and this cycle of charging and discharging was repeated 50 times. In addition, a ratio of discharge capacity at the $50^{th}$ cycle to discharge capacity at the $1^{st}$ cycle was denoted as a discharge capacity retention ratio. That is, the case of Example 3 was subjected to the same treatment as that performed in Example 1, except that the charge voltage of the test cell was 4.1 V. The results thereof are shown in Table 2 below.

Example 4

A test cell fabricated in the same manner as in Example 2 was evaluated using the same method as that used in Example 3. The results thereof are shown in Table 2 below.

Comparative Example 6

A test cell fabricated in the same manner as in Comparative Example 1 was evaluated using the same method as that used in Example 3. The results thereof are shown in Table 2 below.

Comparative Example 7

A test cell fabricated in the same manner as in Comparative Example 2 was evaluated using the same method as that used in Example 3. The results thereof are shown in Table 2 below.

Comparative Example 8

A test cell fabricated in the same manner as in Comparative Example 3 was evaluated using the same method as that used in Example 3. The results thereof are shown in Table 2 below.

Comparative Example 9

A test cell fabricated in the same manner as in Comparative Example 4 was evaluated using the same method as that used in Example 3. The results thereof are shown in Table 2 below. In addition, in Comparative Example 9, rate characteristics were deficient, and thus cycle lifespan was not evaluated.

Comparative Example 10

A test cell fabricated in the same manner as in Comparative Example 5 was evaluated using the same method as that used in Example 3. The results thereof are shown in Table 2 below. In addition, in Comparative Examples 9 and 10, rate characteristics were deficient, and thus cycle lifespan was not evaluated.

TABLE 2

| | Initial discharge capacity (mAh/g) | Rate characteristics (1 C/0.05 C) | Cycle characteristics |
|---|---|---|---|
| Example 3 | 170 | 0.80 | 0.98 |
| Example 4 | 170 | 0.78 | 0.96 |
| Comparative Example 6 | 161 | 0.76 | 0.96 |
| Comparative Example 7 | 168 | 0.80 | 0.92 |
| Comparative Example 8 | 169 | 0.76 | 0.96 |
| Comparative Example 9 | 167 | 0.51 | — |
| Comparative Example 10 | 170 | 0.71 | — |

Evaluation

Even when the voltage was raised to 4.1 V, similar results to those of the case in which the voltage was 4.0 V were obtained.

Example 5

A test cell fabricated in the same manner as in Example 1 was charged at a constant current of 0.05 C and 25° C. up to a maximum voltage of 4.2 V, and then discharged at a constant current of 0.05 C up to a discharge cut-off voltage of 2.5 V. Then, discharge capacity of the test cell was measured, and denoted as initial discharge capacity. Subsequently, the test cell was discharged at 0.05 C, 0.5 C, and 1 C to evaluate rate characteristics. In addition, a ratio of discharge capacity at 1 C to the initial discharge capacity was denoted as an index of load characteristics. In addition, to evaluate cycle lifespan, the obtained test cell was charged at a constant current of 0.05 C and 25° C. up to a maximum voltage of 4.2 V, and discharged at 0.5 C up to a discharge cut-off voltage of 2.5 V, and this cycle of charging and discharging was repeated 50 times. In addition, a ratio of discharge capacity at the $50^{th}$ cycle to discharge capacity at the $1^{st}$ cycle was denoted as a discharge capacity retention ratio. That is, the case of Example 5 was treated in the same manner as in Example 1, except that the charge voltage of the test cell was 4.2 V. The results thereof are shown in Table 3 below.

Example 6

A test cell fabricated in the same manner as in Example 2 was evaluated using the same method as that used in Example 5. The results thereof are shown in Table 3 below.

Comparative Example 11

A test cell fabricated in the same manner as in Comparative Example 1 was evaluated using the same method as that used in Example 5. The results thereof are shown in Table 3 below.

Comparative Example 12

A test cell fabricated in the same manner as in Comparative Example 2 was evaluated using the same method as that used in Example 5. The results thereof are shown in Table 3 below.

Comparative Example 13

A test cell fabricated in the same manner as in Comparative Example 3 was evaluated using the same method as that used in Example 5. The results thereof are shown in Table 3 below.

Comparative Example 14

A test cell fabricated in the same manner as in Comparative Example 4 was evaluated using the same method as that used in Example 5. The results thereof are shown in Table 3 below. In addition, in Comparative Example 14, rate characteristics were deficient, and thus cycle lifespan was not evaluated.

Comparative Example 15

A test cell fabricated in the same manner as in Comparative Example 5 was evaluated using the same method as that used in Example 5. The results thereof are shown in Table 3 below. In addition, in Comparative Examples 14 and 15, rate characteristics were deficient, and thus cycle lifespan was not evaluated.

TABLE 3

| | Initial discharge capacity (mAh/g) | Rate characteristics (1 C/0.05 C) | Cycle characteristics |
|---|---|---|---|
| Example 5 | 188 | 0.81 | 0.98 |
| Example 6 | 186 | 0.78 | 0.94 |
| Comparative Example 11 | 171 | 0.81 | 0.95 |
| Comparative Example 12 | 175 | 0.80 | 0.93 |
| Comparative Example 13 | 186 | 0.77 | 0.96 |
| Comparative Example 14 | 185 | 0.43 | — |
| Comparative Example 15 | 187 | 0.69 | — |

Evaluation

Even when the voltage was raised to 4.2 V, similar results to those of the case in which the voltage was 4.0 V were obtained.

Example 7

$LiNi_{0.8}Co_{0.15}Al_{0.05}O_2$ ("NCA") was used as the core particles 101. The mean particle diameter of the core particles 101 was measured by scattering and, as a result, was 7 μm. Subsequently, the surfaces of the core particles 101 were coated with a mixed solution prepared by mixing lithium methoxide and zirconium propoxide with ethanol. In particular, the amount of the mixed solution was adjusted such that a coating amount of $Li_2O$—$ZrO_2$ ("LZO") with respect to the NCA was 0.5 mol % based on the total amount of the NCA. Subsequently, the surfaces of the core particles 101 were coated with the mixed solution using a tumbling fluidized bed granulating coater (FD-MP-01E) manufactured by POWEREX Co., Ltd. In particular, the mixed solution was sprayed onto the surfaces of the core particles 101 under conditions: 500 g of the core particles 101, an air supply temperature of 90° C., an air supply flow rate of 0.23 $m^3/h$, a rotational speed of a rotor of 400 rpm, an air flow rate of an atomizer of 50 NL/min, and a spraying rate of about 5 g/min. Thereafter, the core particles 101 coated with the mixed solution were dried. The surface-coated core particles 101 were calcined at 350° C. for 1 hour in an air atmosphere to form the first coating layer 102 including LZO on the surfaces of the core particles 101.

Subsequently, a mixed solution was prepared by mixing lithium methoxide and germanium propoxide with ethanol. In particular, the amount of the mixed solution was adjusted such that a coating amount of $Li_2O$—$GeO_2$ ("LGeO") with respect to the NCA was 0.5 mol % based on the total amount of the NCA. Thereafter, the second coating layer 103 including LGeO was formed on the first coating layer 102 using the same treatment method as used above. Through the above-described processes, the composite cathode active material 100, in which the first coating layer 102 and the second coating layer 103 were formed on each core particle 101, i.e., a double layer coated composite cathode active material, was obtained. Subsequently, many cathode active materials were observed using cross-sectional images acquired by a TEM and, as a result, the thickness of the first coating layer 102 ranged from 5 μm to 30 μm, and a total thickness of the first coating layer 102 and the second coating layer 103 ranged from 15 μm to 70 μm.

Manufacture of all-Solid-State Secondary Battery

First, reagents $Li_2S$ and $P_2S_5$ as starting materials of a sulfide-based electrolyte material were weighed so as to obtain a material with a composition of $Li_3PS_4$. Subsequently, the reagents were subjected to mechanical milling treatment using a planetary ball mill while mixed for 20 hours. The mechanical milling treatment was performed at a rotational speed of 380 rpm and in an argon atmosphere.

The sample obtained by mechanical milling treatment was pulverized by an agate mortar. Crystal analysis was performed on the pulverized sample by X-ray diffraction, and it was confirmed whether the starting materials, i.e., $Li_2S$ and $P_2S_5$, remained. In this case, the pulverized sample was used as the solid electrolyte 300.

Subsequently, the prepared composite cathode active material 100, the solid electrolyte 300, and carbon nanofibers ("CNFs") as a conductive agent were mixed in a weight ratio of 60:35:5 to manufacture a cathode mixture. In addition, graphite, the solid electrolyte 300, and vapor grown carbon fiber ("VGCF") as a conductive agent were mixed in a weight ratio of 60:35:5 to prepare an anode mixture. 15 mg of the cathode mixture, 100 mg of the solid electrolyte, and 15 mg of the anode mixture were stacked in this order, and the resulting structure was pressed at a pressure of 3 ton/$cm^2$ to obtain a test cell.

Evaluation of Load Characteristics

The obtained test cell was charged at a constant current of 0.05 C and 25° C. up to a maximum voltage of 4.0 V, and then discharged at a constant current of 0.05 C up to a discharge cut-off voltage of 2.5 V. Then, discharge capacity of the test cell was measured, and denoted as initial discharge capacity. Subsequently, the test cell was discharged at 0.05 C, 0.5 C, and 1 C to evaluate rate characteristics. In addition, a ratio of discharge capacity at 1 C to the initial discharge capacity was denoted as an index of load characteristics.

Cycle Lifespan Test

The obtained test cell was charged at a constant current of 0.05 C and 25° C. up to a maximum voltage of 4.0 V, and discharged at 0.5 C up to a discharge cut-off voltage of 2.5 V, and this cycle of charging and discharging was repeated 50 times. In addition, a ratio of discharge capacity at the $50^{th}$ cycle to discharge capacity at the $1^{st}$ cycle was denoted as a discharge capacity retention ratio. The results thereof are shown in Table 4 below.

Comparative Example 16

The NCA used in Example 7 was used as the core particles 101. Subsequently, the first coating layer 102 including LGeO was formed on the surfaces of the core particles 101 by the same treatment as that performed in Example 7. Thereafter, the second coating layer 103 including LZO was formed on the first coating layer 102 by the same treatment as that performed in Example 7. Thereafter, a test cell was fabricated by the same treatment as that performed in Example 7, and load characteristics and cycle lifespan of the test cell were evaluated. The results thereof are shown in Table 4 below.

Comparative Example 17

The same treatment as that performed in Example 7 was performed, except that the second coating layer 103 was not formed. That is, in Comparative Example 17, only the coating layer including LZO was formed on the surfaces of the core particles 101. The results thereof are shown in Table 4 below.

Comparative Example 18

The NCA used in Example 7 was used as the core particles 101. Subsequently, the same treatment as that performed in Example 2 was performed, except that the first coating layer 102 was not formed. That is, only the coating layer including LNbO was formed on the surfaces of the core particles 101. Thereafter, a test cell was fabricated by the same treatment as that performed in Example 7, and load characteristics and cycle lifespan of the test cell were evaluated. The results thereof are shown in Table 4 below.

Comparative Example 19

The same treatment as that performed in Example 7 was performed, except that the first coating layer 102 was not formed. That is, in Comparative Example 19, only the coating layer including LGeO was formed on the surfaces of the core particles 101. The results thereof are shown in Table 4 below.

TABLE 4

| | Initial discharge capacity (mAh/g) | Rate characteristics (1 C/0.05 C) | Cycle characteristics |
| --- | --- | --- | --- |
| Example 7 | 140 | 0.79 | 0.99 |
| Comparative Example 16 | 132 | 0.76 | 0.83 |
| Comparative Example 17 | 117 | 0.62 | 0.98 |
| Comparative Example 18 | 119 | 0.48 | 0.88 |
| Comparative Example 19 | 131 | 0.69 | 0.86 |

Evaluation

Even when NCA was used as the core particles 101, similar results were obtained.

Example 8

Preparation of Cathode Active Material $LiNi_{0.8}Co_{0.2}Mn_{0.3}O_2$ ("NCM") was used as the core particles. The mean particle diameter of the core particles 101 was measured by scattering and, as a result, was 7 μm. Subsequently, the surfaces of the core particles 101 were coated with a mixed solution prepared by mixing lithium methoxide and zirconium propoxide with ethanol. In particular, the amount of the mixed solution was adjusted such that a coating amount of $Li_2O$—$ZrO_2$ ("LZO") with respect to the NCM was 0.5 mol % based on the total amount of the NCM. Subsequently, the surfaces of the core particles 101 were coated with the mixed solution using a tumbling fluidized bed granulating coater (FD-MP-01E) manufactured by POWEREX Co., Ltd. In particular, the mixed solution was sprayed onto the surfaces of the core particles 101 under conditions: 500 g of the core particles 101, an air supply temperature of 90° C., an air supply flow rate of 0.23 m³/h, a rotational speed of a rotor of 400 rpm, an air flow rate of an atomizer of 50 NL/min, and a spraying rate of about 5 g/min. Thereafter, the core particles 101 coated with the mixed solution were dried. The surface-coated core particles 101 were calcined at 350° C. for 1 hour in an air atmosphere to form the first coating layer 102 including LZO on the surfaces of the core particles 101.

Subsequently, a mixed solution was prepared by mixing lithium methoxide and germanium propoxide with ethanol. In particular, the amount of the mixed solution was adjusted such that a coating amount of $Li_2O$—$GeO_2$ ("LGeO") with respect to the NCM was 0.5 mol % based on the total amount of the NCM. Thereafter, the second coating layer 103 including LGeO was formed on the first coating layer 102 using the same treatment method as used above. Through the above-described processes, the composite cathode active material 100, in which the first coating layer 102 and the second coating layer 103 were formed on each core particle 101, i.e., a double layer coated composite cathode active material, was obtained. Subsequently, many cathode active materials were observed using cross-sectional images acquired by a TEM and, as a result, the thickness of the first coating layer 102 ranged from 3 μm to 30 μm, and a total thickness of the first coating layer 102 and the second coating layer 103 ranged from 6 μm to 70 μm.

Manufacture of all-Solid-State Secondary Battery

First, reagents $Li_2S$ and $P_2S_5$ as starting materials of a sulfide-based electrolyte material were weighed so as to obtain a material with a composition of $Li_3PS_4$. Subsequently, the reagents were subjected to mechanical milling treatment using a planetary ball mill while mixed for 20 hours. The mechanical milling treatment was performed at a rotational speed of 380 rpm and in an argon atmosphere.

The sample with the composition of $Li_3PS_4$, obtained by mechanical milling treatment, was pulverized by an agate mortar. Crystal analysis was performed on the pulverized sample by X-ray diffraction, and it was confirmed whether the starting materials, i.e., $Li_2S$ and $P_2S_5$, remained. In this case, the pulverized sample was used as the solid electrolyte 300.

Subsequently, the prepared composite cathode active material 100, the solid electrolyte 300, and VGCF as a conductive agent were mixed in a weight ratio of 60:35:5 to manufacture a cathode mixture. In addition, graphite, the solid electrolyte 300, and VGCF as a conductive agent were mixed in a weight ratio of 60:35:5 to prepare an anode mixture. 15 mg of the cathode mixture, 100 mg of the solid electrolyte 300, and 15 mg of the anode mixture were stacked in this order, and the resulting structure was pressed at a pressure of 3 ton/cm² to obtain a test cell.

Evaluation of Load Characteristics

The obtained test cell was charged at a constant current of 0.05 C and 25° C. up to a maximum voltage of 4.0 V, and then discharged at a constant current of 0.05 C up to a discharge cut-off voltage of 2.5 V. Then, discharge capacity of the test cell was measured, and denoted as initial discharge capacity. Subsequently, the test cell was discharged at 0.05 C, 0.5 C, and 1 C to evaluate rate characteristics. In addition, a ratio of discharge capacity at 1 C to the initial discharge capacity was denoted as an index of load characteristics.

Cycle Lifespan Test

The obtained test cell was charged at a constant current of 0.05 C and 25° C. up to a maximum voltage of 4.0 V, and discharged at 0.5 C up to a discharge cut-off voltage of 2.5 V, and this cycle of charging and discharging was repeated 50 times. In addition, a ratio of discharge capacity at the 50$^{th}$ cycle to discharge capacity at the 1$^{st}$ cycle was denoted as a discharge capacity retention ratio. The results thereof are shown in Table 5 below.

Comparative Example 20

The NCM used in Example 8 was used as the core particles 101. Subsequently, the first coating layer 102 including LGeO was formed on the surfaces of the core particles 101 by the same treatment as that performed in Example 8. Thereafter, the second coating layer 103 including LZO was formed on the first coating layer 102 by the same treatment as that performed in Example 8. Thereafter, a test cell was fabricated by the same treatment as that performed in Example 8, and load characteristics and cycle lifespan of the test cell were evaluated. The results thereof are shown in Table 5 below.

Comparative Example 21

The same treatment as that performed in Example 8 was performed, except that the second coating layer 103 was not formed. That is, in Comparative Example 21, only the coating layer including LZO was formed on the surfaces of the core particles 101. The results thereof are shown in Table 5 below.

Comparative Example 22

The same treatment as that performed in Example 8 was performed, except that the first coating layer 102 was not formed. That is, in Comparative Example 22, only the coating layer including LGeO was formed on the surfaces of the core particles 101. The results thereof are shown in Table 5 below.

TABLE 5

| | Initial discharge capacity (mAh/g) | Rate characteristics (1 C/0.05 C) | Cycle characteristics |
|---|---|---|---|
| Example 8 | 105 | 0.5 | 0.98 |
| Comparative Example 20 | 103 | 0.45 | 0.97 |
| Comparative Example 21 | 101 | 0.32 | 0.96 |
| Comparative Example 22 | 101 | 0.33 | 0.96 |

Evaluation

As shown in Table 5, the cell of Example 8 exhibits superior capacity characteristics, superior rate characteristics, and superior cycle characteristics to those of the cells of Comparative Examples 20 to 22.

As described above, according to embodiments, the core particles 101 are covered by the first coating layer 102 and the second coating layer 103, and the first coating layer 102 and the second coating layer 103 include elements as described above. Thus, an all-solid-state secondary battery including the core particles 101, the first coating layer 102, and the second coating layer 103 may exhibit further enhanced characteristics. In addition, each coating layer is formed by applying an alkoxide of a constitutional element of each coating layer on the core particles 101 and calcining the resulting structure, and thus production thereof may be easily performed, resulting in high productivity.

As is apparent from the foregoing description, core particles including a cathode active material are covered by a first coating layer and a second coating layer, and the first coating layer and the second coating layer include components as described above. Thus, a reaction occurring at an interface between a solid electrolyte and a composite cathode active material that includes the core particles, the first coating layer, and the second coating layer may be suppressed. In addition, the first coating layer and the second coating layer may be formed by applying an alkoxide of a constitutional element of these coating layers on surfaces of cathode active material particles and calcining the resulting structure, and thus production thereof may be easy, resulting in high productivity.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A composite cathode active material comprising:
   a core particle;
   a first coating layer; and
   a second coating layer,
wherein
   the core particle comprises a lithium transition metal oxide having a layered halite structure,
   the first and second coating layers cover a surface of the core particle,
   the first coating layer comprises a first lithium-containing compound, wherein the first lithium-containing compound comprises $aLi_2O$—$ZrO_2$ where $0.1 \leq a \leq 2$, lithium titanium oxide, lithium aluminum oxide, lithium niobium oxide, or a combination thereof, the second coating layer comprises a second lithium-containing compound, wherein the second lithium-containing compound comprises germanium, niobium, gallium, or a combination thereof, the first lithium-containing compound is different from the second lithium-containing compound, the first coating layer is disposed on the surface of the core particle, and the second coating layer is disposed on a surface of the first coating layer, the first coating layer has a thickness of about 1 nanometer to about 50 nanometers, a total thickness of the first coating layer and the second coating layer is greater than about 1 nanometer to about 500 nanometers, the composite cathode active material comprises a plurality of core particles, and the core particles of the plurality of core particles have a mean particle diameter of about 0.1 micrometers to about 10 micrometers.

2. The composite cathode active material of claim 1, wherein the first coating layer is disposed directly on the surface of the core particle, and the second coating layer is disposed directly on a surface of the first coating layer.

3. The composite cathode active material of claim 1, wherein the second lithium-containing compound comprises lithium germanium oxide, lithium niobium oxide, lithium gallium oxide, or a combination thereof.

4. A cathode comprising the composite cathode active material according to claim 1.

5. A lithium secondary battery comprising:
the cathode according to claim 4;
an anode; and
a sulfide solid electrolyte between the cathode and the anode.

6. A composite cathode active material comprising:
a core particle;
a first coating layer; and
a second coating layer,
wherein
the core particle comprises a cathode active material,
the first and second coating layers cover a surface of the core particle,
the first coating layer comprises a first lithium-containing compound, wherein the first lithium-containing compound comprises zirconium, niobium, titanium, aluminum, or a combination thereof,
the second coating layer comprises a second lithium-containing compound, wherein the second lithium-containing compound comprises germanium, niobium, gallium, or a combination thereof,
the first lithium-containing compound is different from the second lithium-containing compound,
the first coating layer is disposed on the surface of the core particle, and the second coating layer is disposed on a surface of the first coating layer, and
the core particle comprises $LiNi_xCo_yM_zO_2$ where M is aluminum or manganese, $0<x<1$, $0<y<1$, and $x+y+z=1$,
the first coating layer has a thickness of about 1 nanometer to about 50 nanometers,
a total thickness of the first coating layer and the second coating layer is greater than about 1 nanometer to about 500 nanometers,
the composite cathode active material comprises a plurality of core particles, and
the core particles of the plurality of core particles have a mean particle diameter of about 0.1 micrometer to about 10 micrometers.

7. The composite cathode active material of claim 6, wherein $0.5<x<1$.

8. A cathode comprising the composite cathode active material according to claim 6.

9. A lithium secondary battery comprising:
the cathode according to claim 8;
an anode; and
a sulfide solid electrolyte between the cathode and the anode.

10. An all-solid-state lithium secondary battery comprising:
a cathode comprising a composite cathode active material comprising
a core particle;
a first coating layer; and
a second coating layer,
wherein
the core particle comprises a cathode active material,
the first and second coating layers cover a surface of the core particle,
the first coating layer comprises a first lithium-containing compound, wherein the first lithium-containing compound comprises zirconium, niobium, titanium, aluminum, or a combination thereof,
the second coating layer comprises a second lithium-containing compound, wherein the second lithium-containing compound comprises germanium, niobium, gallium, or a combination thereof,
the first lithium-containing compound is different from the second lithium-containing compound,
the first coating layer is disposed on the surface of the core particle, and the second coating layer is disposed on a surface of the first coating layer,
an anode; and
an electrolyte between the cathode and the anode,
wherein the electrolyte comprises a sulfide solid electrolyte,
the first coating layer has a thickness of about 1 nanometer to about 50 nanometers,
a total thickness of the first coating layer and the second coating layer is greater than about 1 nanometer to about 500 nanometers,
the composite cathode active material comprises a plurality of core particles, and
the core particles of the plurality of core particles have a mean particle diameter of about 0.1 micrometers to about 10 micrometers.

11. The all-solid-state lithium secondary battery of claim 10, wherein the sulfide solid electrolyte comprises sulfur, lithium, and phosphorus, silicon, boron, aluminum, germanium, zinc, gallium, indium, a halogen, or a combination thereof.

12. The all-solid-state lithium secondary battery of claim 10, wherein the sulfide solid electrolyte comprises lithium sulfide and silicon sulfide, phosphorus sulfide, boron sulfide, or a combination thereof.

13. The all-solid-state lithium secondary battery of claim 10, wherein the sulfide solid electrolyte comprises $Li_2S$ and $P_2S_5$.

14. The all-solid-state lithium secondary battery of claim 10, wherein the sulfide solid electrolyte is in a form of a particle.

* * * * *